March 27, 1928. 1,664,156
T. V. BUCKWALTER
ROLLING MILL
Filed Jan. 11, 1926 3 Sheets-Sheet 1

March 27, 1928.

T. V. BUCKWALTER

ROLLING MILL

Filed Jan. 11, 1926

INVENTOR:
Tracy V. Buckwalter,
by his ATTORNEYS.

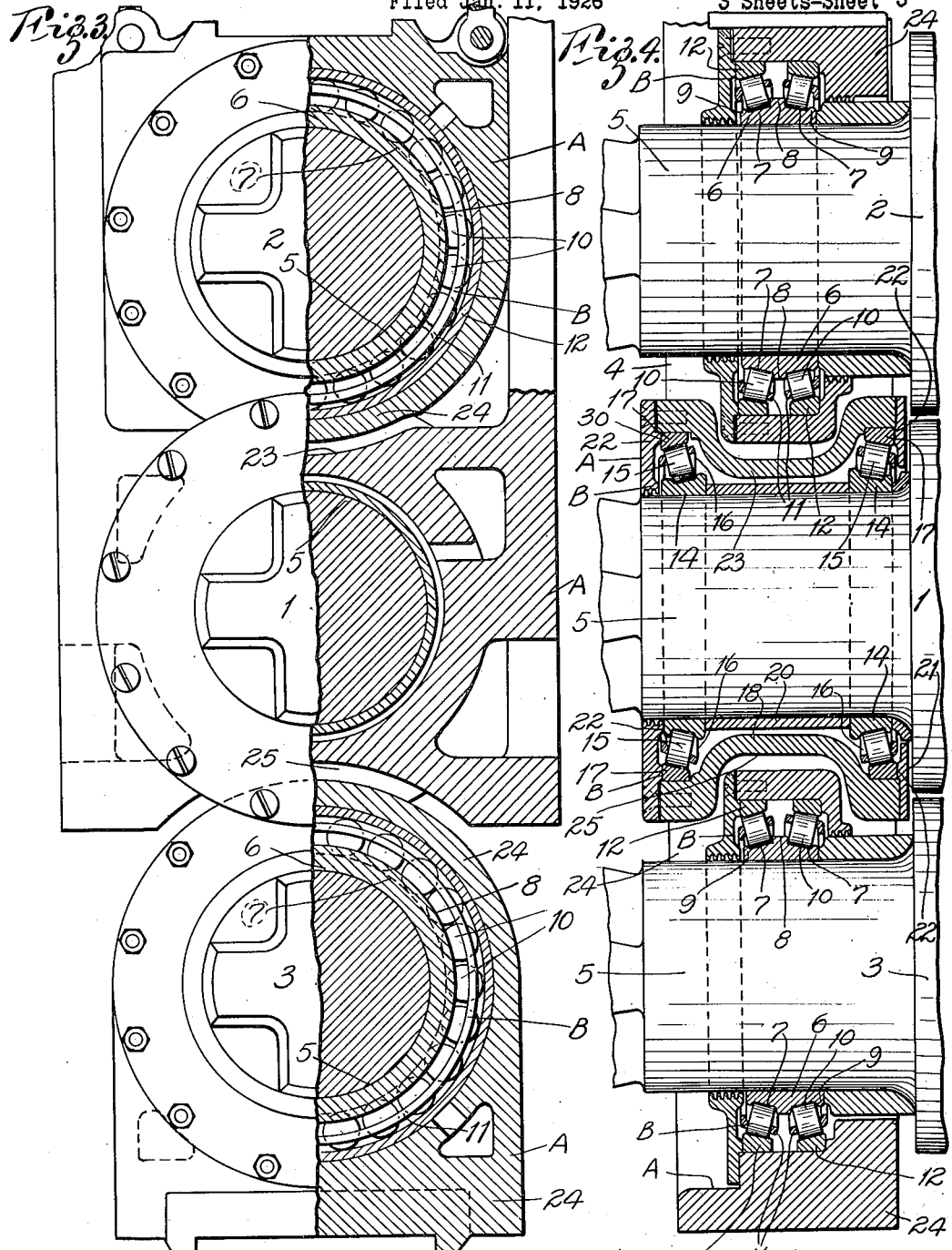

Patented Mar. 27, 1928.

1,664,156

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

ROLLING MILL.

Application filed January 11, 1926. Serial No. 80,470.

My invention relates to rolling mills, particularly mills of the type commonly called "three-high" mills; and its principal object is to provide for the mounting of the rolls in roller bearings. Another object is to devise an arrangement whereby the rolls of existing mills may be mounted in roller bearings without modification of the rolls or housings therefor. The invention consists principally in forming in the housing of one or more of the bearings between the raceways thereof, recesses that are adapted to accommodate the housing or housings of the bearings of the other roll or rolls. It also consists in the arrangements and combinations of parts hereinafter described and claimed.

In the accompanying drawing which forms part of this specification and wherein like numerals refer to like parts wherever they occur, Fig. 1 is an end elevation of a three-high rolling mill embodying my invention;

Fig. 3 is a detail view partly in elevation and partly in section of the front end of the rolls and their housing; and Fig. 4 is a longitudinal sectional detail view through the roller bearings of the rolls.

Figure 1:
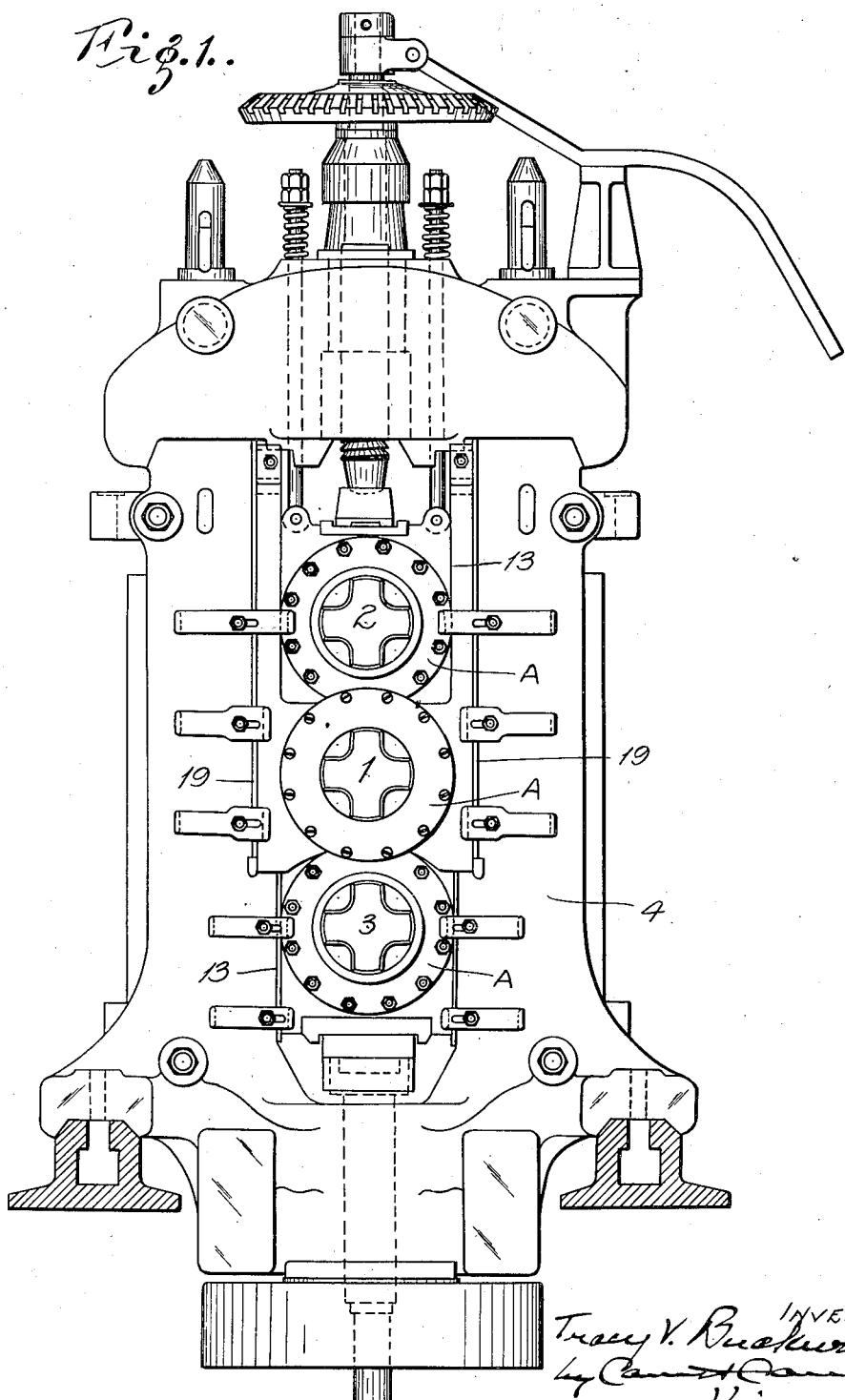
Figure 2:
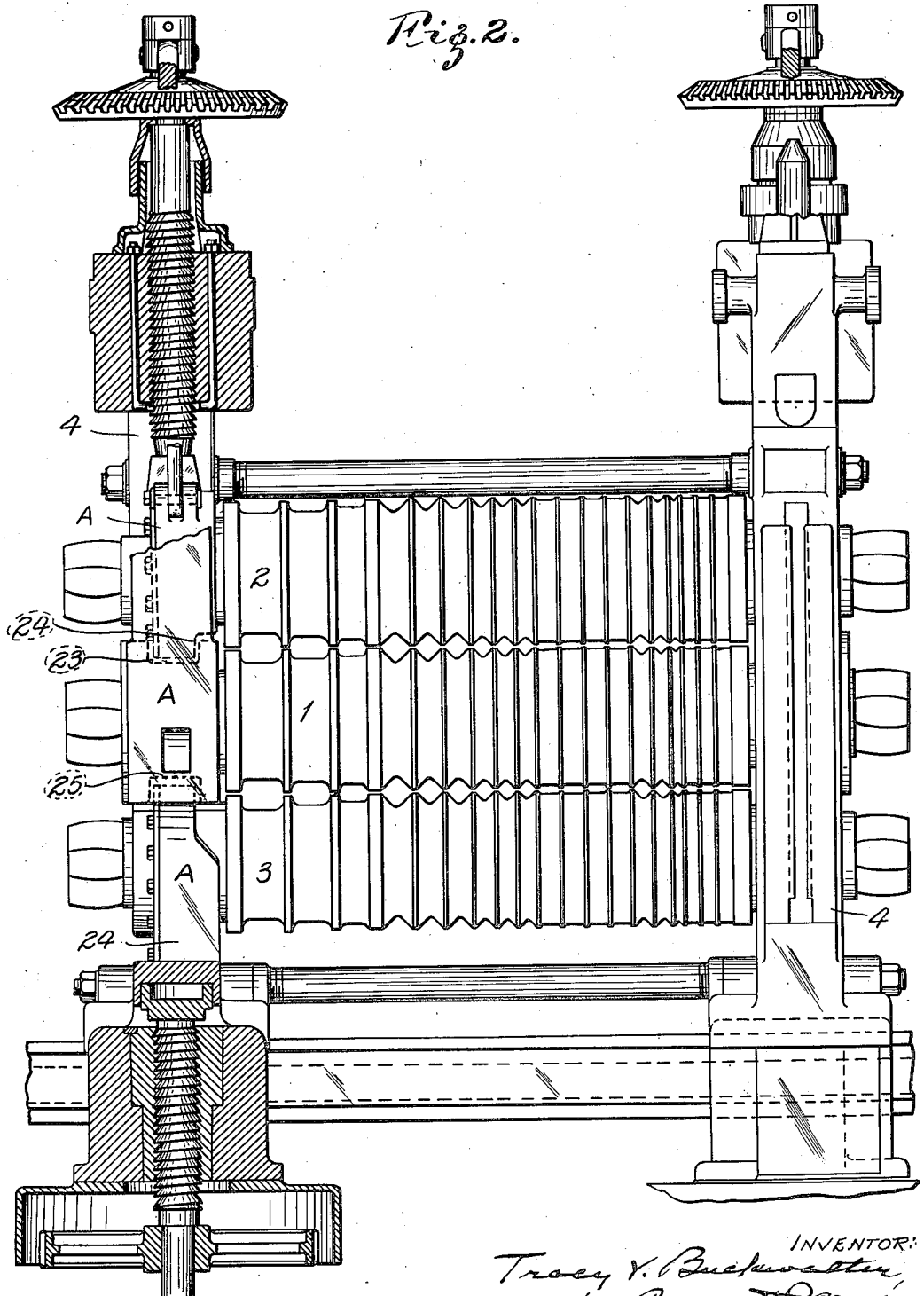
Fig. 2 is a front elevaton thereof with certain parts shown in section.

My mill comprises a middle roll 1, and top and bottom rolls 2, 3 mounted in housings A provided therefor on suitable end frames 4. According to the present invention, conical roller bearings B are interposed between the necks 5 of the rolls and the housings therefor. In the construction illustrated, the roller bearings of the top and bottom rolls comprise an inner bearing member 6 in the form of a double cone mounted on the neck 5 of the roll. Said inner member 6 has two conical raceways 7 inclined in opposite directions with an annular rib 8 between them and with annular ribs 9 at the smaller ends of said raceways. Series of taper rollers 10 with suitable cages 11 therefor, are arranged on said raceways 7 to cooperate therewith and with cups 12 or outer bearing members provided therefor in the housings. There is one such housing for each end of the roll and each housing is removably mounted in slideways 13 provided therefor in the end frames of the mill.

In the construction illustrated, the bearing 13 at each end of the middle roll 1 comprises two cones 14 or inner bearing members spaced a considerable distance apart on the neck 5 of said roll; and such bearing also comprises two series of conical rollers 15, preferably with cages 16 and cups 17 or outer bearing members therefor suitably mounted in a housing 18, which also is removably mounted in vertical slideways 19 provided therefor in the end frames of the mill. Preferably a spacer sleeve 20 is interposed between the two cones 14. The ends of the housings are preferably provided with suitable dust excluding rings 21. Said rings may have ribs 22 engaging the cups of the bearings.

As a matter of practical necessity, the distance between the axes of the rolls is limited; and likewise it is impracticable to reduce the diameter of the necks of the rolls beyond the minimum imposed by the expected stresses occasioned by the rolling operation. Accordingly, the space between the necks of adjacent rolls is not sufficient to accommodate conical roller bearings of a size adequate for the work without modification thereof. According to the present invention, as illustrated in the drawing, the housing 18 of the bearing for the middle roll 1 has a concave recess 23 in its middle portion between its two series of rollers of sufficient size and depth to accommodate the housing 24 of the bearing of the top roll 2, together with an additional clearance sufficient to permit the adjustment of the rolls when they wear. A similar recess 25 in the bottom of the housing 18 of the bearing of the middle roll accommodates the housing 24 of the bearing of the lower roll 3.

By the foregoing arrangement, the bearings for the three rolls are maintained in central vertical alinement with each other, as the two series of rollers of each bearing cooperate to constitute a single bearing. It is noted that my invention does not require any increase in the length of the rolls over present practice and that it may be applied to existing mills without any change in the frames thereof and without any change in the rolls thereof other than the removal of the journal bearings and housings therefor and the substitution of my bearings and their housings. It is further noted that by reason of the clearance provided for in the recesses of the housing of the middle bearing, the rolls may be adjusted from time to time as required.

While I have described the recesses as located in the housing of the middle bearing, arranged to accommodate the housings of the top and bottom bearings, it is obvious that the arrangement might be reversed; that is, that the bearings for the top and bottom rolls may be made with their two series of rollers spaced widely enough apart to permit their housings to be provided with recesses adapted to accommodate the housing of the middle roll, in which case the bearing of the middle roll will be made in the compact form illustrated in the drawing as applied to the top and bottom rolls. It is also obvious that the invention is applicable to two-high mills and to other constructions wherein parallel journals or shafts are required to be close together.

What I claim is:

1. A rolling mill comprising a frame having housing members, parallel rolls journaled in said housing members and roller bearings interposed between the necks of said rolls and said housings, the bearing of one of said rolls comprising two sets of rollers spaced apart and the other bearing comprising rollers located between the planes of said first mentioned sets of rollers, and the housing of said first mentioned bearing being recessed to accommodate the housing of said second bearing.

2. A rolling mill comprising a frame having vertically alined housing members, parallel rolls journaled in said housing members and roller bearings interposed between the necks of said rolls and said housings, one of said bearings comprising two sets of oppositely disposed conical rollers widely spaced apart and the other bearing comprising rollers located between the planes of said first mentioned sets of rollers, and the housing of said first mentioned bearing being recessed to accommodate the housing of said second bearing.

3. A three-high rolling mill comprising end frames, vertically alined roll housings in said frames, rolls having their end portions mounted in said housings, and roller bearings interposed between the necks of said rolls and said housings, the bearing of the middle roll comprising oppositely disposed conical rollers widely spaced apart, and the bearings of the top and bottom rolls, comprising rollers located between the planes of said sets of rollers of said middle roll, and the middle housing being recessed to accommodate the top and bottom housings.

Signed at Canton, Ohio, this 6th day of Jan., 1926.

TRACY V. BUCKWALTER.